Patented Oct. 4, 1938

2,132,181

UNITED STATES PATENT OFFICE 2,132,181

PROCESS FOR THE MANUFACTURE OF CARBOHYDRATE COMPOUNDS

Wilhelm Neugebauer, Ulrich Ostwald, and Kurt Sponsel, Wiesbaden-Biebrich, Germany, assignors to Kalle & Co. Aktiengesellschaft, Wiesbaden-Biebrich, Germany No Drawing. Application March 15, 1937, Serial No. 130,868. In Germany March 14, 1936

6 Claims. (Cl. 260—152)

(Granted under the provisions of sec. 14, act of March 2, 1927; 357 O. G. 5)

The present invention relates to processes for the manufacture of carbohydrate compounds.

It has been found that by causing carbohydrates in an alkaline medium to react with olefine sulfonic acids, particularly $\alpha,\beta$-unsaturated olefine sulfonic acids such as ethene sulfonic acid, technically valuable carbohydrate ethers are obtained. Preferably large quantities of alkali are employed. In the reaction of cellulose with an olefine sulfonic acid, for instance, good results are obtained if so much alkali is employed that the cellulose and the employed sulfonic acid are present in the form of their alkali compounds. It is preferable to employ even more alkali because the reaction is favorably influenced by excess of alkali. The reaction takes place very readily. The process exhibits the advantage over other etherification processes that no salts, the removal of which from the easily soluble reaction products would offer difficulties, are formed as by-products.

For the reaction, in particular high molecular carbohydrates such as cellulose, starch and the like, may be employed as may also substitution products thereof such as ether, mixed ethers and so forth, so long as they still contain in the molecule places capable of reacting. It is further possible, after the conversion of the carbohydrates by the aid of the olefine sulphonates, to subject the products obtained to still further conversions. Thus, for example, valuable products are obtained if cellulose is converted by the aid of an alkaline solution of sodium ethene sulphonate, and is treated after the termination of the reaction with still further alkylating means, such as methyl chloride, ethyl chloride, ethylene oxide, chloracetic acid and the like.

The quantity of the employed olefine sulphonic acids depends upon the desired properties of the products to be obtained. In general about 0.5–1 molecule of olefine sulphonate is allowed to act on 1 molecule of cellulose ($C_6H_{10}O_5$). Water soluble conversion products are then obtained. If products soluble in alkali are desired then a smaller quantity of olefine sulphonate suffices.

The best reaction temperature in any given case is dependent on the alkali concentration employed. Thus, for example, in the reaction of alkali cellulose with ethene sulphonate in the presence of 50% soda lye it is possible to work at 35–45° C., while when more dilute lyes are employed, higher temperatures are necessary, for example, when 30% lye is employed, about 60–70° C.

The products manufactured according to the invention can be employed as emulsifying and washing means, particularly in admixture with moistening means, as thickening means, more particularly as thickening means for printing, as finishing and sizing means, as protective colloids and for all purposes for which hitherto tragacanth and similar colloids were used.

The following examples illustrate the invention:

(1) 100 kgs. of sulphite cellulose are soaked with 40% soda lye at room temperature. After standing for 12 hours the mass is pressed down to 260 kgs., is reduced to fibers and is mixed or kneaded respectively with 600 kgs. of a 50% soda lye. 150 kgs. of finely ground sodium ethene sulphonate are then gradually worked in and the mixture is allowed to stand for a further 4 hours at 50° C., while kneading the mass, if desired. The reaction product yields with water a viscous solution. For the isolation of the sodium cellulose-ethyl-ether-($\beta$) sulphonate, the procedure may be adopted that the lye clinging to the reaction product is pressed away from the latter, the pressed residue is mixed with water and is neutralized with hydrochloric acid. The cellulose ether is then precipitated out by treatment with a water soluble organic solvent such as methanol. The cellulose ether is then filtered, washed with 80% methanol, then dried.

(2) 100 kgs. of cellulose are soaked with 40% soda lye and pressed down to about 300 kgs. Esterification is then carried out with 10 kgs. of ethylene oxide, for example, according to the mode of operation described in the German patent specification No. 536,993. The product thus produced is reduced to fibers and is mixed or kneaded with 600 kgs. of a 35% soda lye. Then 300 kgs. of a 50% aqueous solution of sodium ethene sulphonate are allowed gradually to run in at 60° C. The mixture is then kept at the same temperature for a further 3–4 hours while stirring. When the resulting product is mixed with water a viscous solution is obtained, which, even when rendered acid, does not separate out in flocks. For the isolation of the reaction product, the mode of operation described in Example 1 may be employed.

(3) 100 kgs. of cellulose are immersed in 40% soda lye and after a few hours are pressed down to about 300 kgs. The alkali cellulose is reduced to fibers and is kneaded with 250 kgs. of a 50% solution of sodium ethene sulphonate. After uniform mixing has taken place, the mass is further mixed with 450 kgs. of a 50% soda lye and is heated up to 50° C. It is then allowed to remain at this temperature for about 3 hours.

The working up of the product may be effected in the manner described in Example 1.

(4) 200 gms. of sulphite cellulose are soaked with 2000 gms. of a 30% soda lye at 8° C. and pressed down to about 2.6 times the original weight. The obtained alkali cellulose is reduced to fibers and then 180 gms. of sodium 2-methyl-2,3-propylene sulphonate are added. The temperature is slowly increased while kneading the mixture. The mass is then kept at 60-70° C. until the alkali cellulose is converted. The product thus produced is water soluble and can be employed as thickening means, for example, for vat dyes. It is possible to free the product from impurities by washing it with 80% methanol or by dialyzing it.

(5) 100 kgs. of methyl cellulose containing one methoxy group combined with two glucose units are soaked with 600 kgs. of 45% soda lye. After three hours 180 kgs. of potassium ethene sulphonate are added while kneading. The mixture is then heated up to 65° C. and allowed to remain 3-4 hours at this temperature. The obtained mass is worked up as described in Example 1.

We claim:

1. The method of etherifying a carbohydrate which comprises causing an olefine sulfonic acid in an alkaline medium to react with the carbohydrate.

2. The method of etherifying a carbohydrate which comprises causing an $\alpha,\beta$-unsaturated olefine sulfonic acid in an alkaline medium to react with the carbohydrate.

3. The method of etherifying a carbohydrate which comprises causing ethene sulfonic acid in an alkaline medium to react with the carbohydrate.

4. The method of etherifying a substance selected from the group consisting of cellulose and its derivatives which comprises causing an olefine sulfonic acid in an alkaline medium to react with the said substance.

5. The method of etherifying a substance selected from the group consisting of cellulose and its derivatives which comprises causing an $\alpha,\beta$-unsaturated olefine sulfonic acid in an alkaline medium to react with the said substance.

6. The method of etherifying a substance selected from the group consisting of cellulose and its derivatives which comprises causing ethene sulfonic acid in an alkaline medium to react with the said substance.

WILHELM NEUGEBAUER.
ULRICH OSTWALD.
KURT SPONSEL.